(12) United States Patent
Yi

(10) Patent No.: US 8,213,111 B2
(45) Date of Patent: Jul. 3, 2012

(54) HEAD SLIDER AND HARD DISK DRIVE HAVING THE SAME

(75) Inventor: Seung-young Yi, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 825 days.

(21) Appl. No.: 12/136,870

(22) Filed: Jun. 11, 2008

(65) Prior Publication Data

US 2008/0304182 A1 Dec. 11, 2008

(30) Foreign Application Priority Data

Jun. 11, 2007 (KR) .......................... 10-2007-0056751

(51) Int. Cl.
*G11B 17/02* (2006.01)
*G11B 5/60* (2006.01)

(52) U.S. Cl. .................................. 360/97.11; 360/235.4

(58) Field of Classification Search ............... 360/234.3, 360/234.7, 235.4–237, 97.11
See application file for complete search history.

(56) References Cited

U.S. PATENT DOCUMENTS

| 4,486,798 A * | 12/1984 | Feliss et al. | 360/234.6 |
| 4,945,427 A * | 7/1990 | Cunningham | 360/75 |
| 5,097,370 A * | 3/1992 | Hsia | 360/236.1 |
| 5,682,274 A * | 10/1997 | Brown et al. | 360/77.04 |
| 5,724,212 A * | 3/1998 | Mallary et al. | 360/264.1 |
| 5,859,740 A * | 1/1999 | Takeda et al. | 360/77.02 |
| 5,870,250 A * | 2/1999 | Bolasna et al. | 360/236.8 |
| 6,128,162 A * | 10/2000 | Kameyama | 360/236.2 |
| 6,487,049 B1 * | 11/2002 | Hall | 360/246.8 |
| 6,744,599 B1 * | 6/2004 | Peng et al. | 360/236.2 |

FOREIGN PATENT DOCUMENTS

| JP | 04-355292 | 12/1992 |
| JP | 07-111053 | 4/1995 |
| JP | 2000339638 A * | 12/2000 |

OTHER PUBLICATIONS

English-machine translation of JP 2000-339638 A to Okumura et al., published on Dec. 8, 2000.*
KR Office Action issued Sep. 25, 2008 in KR Patent Application No. 10-2007-0056751.

* cited by examiner

*Primary Examiner* — Will J Klimowicz
(74) *Attorney, Agent, or Firm* — Hall Estill Attorneys at Law

(57) ABSTRACT

A hard disk drive includes a base member, a disk which is a data storage medium to rotate at a high speed on the base member, and a head stack assembly (HSA) having a head slider including a magnetic head to write data on the disk or to reproduce data recorded on the disc, and an ABS pattern formed on a disk facing surface of the head slider to generate a lifting force, and is rotatably mounted on the base member so that the head slider moves between inner circumferences and outer circumferences of the disk in a floating state over the disc, wherein if a center line of the ABS pattern is an ABS line and a straight line extending in a direction in which an air flow induced due to the high speed rotation of the disk enters the ABS pattern is an air flow line, a crossing angle between the ABS line and the air flow line is reduced as the head slider moves from the outer circumferences to the inner circumferences.

8 Claims, 6 Drawing Sheets

HEAD SLIDER AND HARD DISK DRIVE HAVING THE SAME

CROSS-REFERENCE TO RELATED APPLICATIONS

This application claims priority under 35 U.S.C. §119(a) from Korean Patent Application No. 10-2007-0056751, filed on Jun. 11, 2007, in the Korean Intellectual Property Office, the disclosure of which is incorporated herein in its entirety by reference.

BACKGROUND OF THE INVENTION

1. Field of the Invention

The present general inventive concept relates to a hard disk drive, and more particularly, to a head slider having an improved floating property when the head slider is positioned on an inner circumference of a disk and a hard disk drive including the head slider.

2. Description of the Related Art

A hard disk drive (HDD) is an example of auxiliary memory devices used by computers, MP3 players, or mobile phones, and an apparatus that reads data stored in a disc, which is a data storage medium, or writes new data on the disk using a head slider which is a write/read medium of data. The head slider maintains a floating state by being lifted a predetermined gap from the disk during an operation of the HDD, and a magnetic head formed in the head slider reads data stored in the disk to reproduce the data or write new data on the disc.

The floating height of the head slider during the operation of the HDD is determined by an equilibrium height between a lifting force of the head slider due to air bearing between the head slider and a surface of the disk and a suspension elastic force that supports the head slider.

FIG. 1 is a plan view of a conventional head slider 15 floating over a disk 1 in a conventional HDD, and FIG. 2 is a plan view of the conventional head slider 15 that faces the disk 1.

Referring to FIGS. 1 and 2, an air bearing surface (ABS) pattern 25 to induce lifting of the conventional head slider 15 is formed on a surface of the conventional head slider 15 that faces the disk 1, and the ABS pattern 25 generally has a symmetrical shape with respect to a center line L1 (hereinafter, an ABS line) that denotes half of a face of the conventional head slider 15 that faces the disk 1. In a conventional head stack assembly (HSA) 10, the conventional head slider 15 is mounted on an end of the HSA 10 so that an imaginary line L2 (hereinafter, an HSA line L2) to connect a magnetic head 20 formed on the conventional head slider 15 to the rotation center C2 of the HSA 10, and the ABS line L1 can coincide.

The disk 1, which is a data storage medium, rotates at a high speed in a counter clockwise direction about a rotation center C1 during the operation of the HDD, and thus, an air flow in a counter clockwise direction is formed on the disk 1 due to the rotation of the disk 1. Such air flow enters the face of the conventional head slider 15 that faces the disc, and flows along the ABS pattern 25, and thus, generating a lift of the conventional head slider 15. A magnitude of the lift is related to a speed of the air flow and a shape of the ABS pattern 25. The speed of the air flow is proportional to a distance from the rotation center C1 of the disk 1. The ABS pattern 25 is designed to be maximally lifted when the direction of the air flow and the ABS line L1 are parallel.

When the conventional head slider 15 is located at middle circumferences 3 between inner circumferences 2 and outer circumferences 4 of the disc1, a straight line L4(ii) (hereinafter, an air flow line L4) extending in the direction of the air flow as indicated by the arrow W(ii) and the HSA line L2, that is, the ABS line L1, are parallel, and thus, a crossing angle between the air flow line L4(ii), indicated by the arrow W(ii), and the ABS line L1 is 0 degrees. Accordingly, the conventional head slider 15 maintains a stable floating state in the middle circumferences 3 of the disk 1.

When the conventional head slider 15 is located at a point of the outer circumferences 4 of the disk 1, an air flow line L4(iii) extending in the direction of the air flow as indicated by the arrow W(iii) is inclined with respect to the ABS line L1. Thus, a crossing angle between the air flow line L4(iii) and the ABS line L1 is greater than when the conventional head slider 15 is located in the middle circumferences 3. However, since the speed of the air flow in the outer circumferences 4 is greater than that of the air flow in the middle circumferences 3, the conventional head slider 15 can also maintain a stable floating state in the outer circumferences 4.

When the conventional head slider 15 is located at a point of the inner circumferences 2 of the disk 1, an air flow line L4(i) extending in the direction of the air flow indicated by the arrow W(i) is inclined in a direction opposite to the air flow line L4(iii) as described above. Thus, a crossing angle between the air flow line L4(i) and the ABS line L1 is greater than when the conventional head slider 15 is located at the middle circumferences 3 of the disk 1. However, in this case, since the speed of the air flow in the inner circumferences 2 is lower than that of the air flow in the middle circumferences 3, the lifting of the conventional head slider 15 is reduced. As a result, an instable floating of the conventional head slider 15 increases the contact (head-disk interference (HDI)) between the disk 1 and the conventional head slider 15.

SUMMARY OF THE INVENTION

The present general inventive concept provides a head slider that can stably float at inner circumferences of a disk and a hard disk drive (HDD) including the head slider.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a head slider including a magnetic head to write data onto a disk which is a data storage medium or to reproduce data recorded on the disc, and an air bearing surface (ABS) pattern formed on a disk facing surface of the head slider to generate a lifting force, wherein the magnetic head includes a reproducing unit to reproduce data, and a writing unit stacked on a side of the reproducing unit to write data, and if a center line of the ABS pattern is an ABS line, and a straight line extending in a direction in which the reproducing unit and the writing unit are stacked is a head line, the ABS line is inclined with respect to the head line.

If an edge of the head slider where an air flow induced due to a rotation of the disk at a high speed enters the disk facing surface of the head slider is a leading edge, and an edge of the head slider where the air flow that enters from the leading edge flows out is a trailing edge, the ABS line may coincide with a straight line to connect a center of the leading edge and a center of the trailing edge.

The foregoing and/or other aspects and utilities of the general inventive concept may also be achieved by providing a hard disk drive including a base member, a disk which is a data storage medium to rotate at a high speed on the base member, and a head stack assembly (HSA) having a head slider including a magnetic head to write data on the disk or to reproduce data recorded on the disc, and an ABS pattern formed on a disk facing surface of the head slider to generate a lifting force, and is rotatably mounted on the base member so that the head slider moves between inner circumferences and outer circumferences of the disk in a floating state over the disc, wherein if a center line of the ABS pattern is an ABS line and a straight line extending in a direction in which an air flow induced due to the high speed rotation of the disk enters the ABS pattern is an air flow line, a crossing angle between the ABS line and the air flow line is reduced as the head slider moves from the outer circumferences to the inner circumferences.

The magnetic head may include a reproducing unit to reproduce data and a writing unit stacked on a side of the reproducing unit to write data, and if a straight line extending in a direction in which the reproducing unit and the writing unit are stacked is a head line, the ABS line may be inclined with respect to the head line.

The disk may include a plurality of tracks concentrically formed with respect to a rotation center of the disc, and a crossing angle between a tangential line of a respective track and the head line at a point where the head line and the respective track of the disk overlap may be 0 degrees when the head slider is located at a point in middle circumferences of the disk between the inner circumferences and the outer circumferences, and the crossing angle may increase as the head slider moves towards the inner circumferences or the outer circumferences.

If a straight line to connect the rotation center of the HSA and the magnetic head is an HSA line, the HSA line and the head line may be parallel to each other.

If a straight line to connect the rotation center of the HSA and the magnetic head is an HSA line, the ABS line may be inclined with respect to the HSA line.

The disk may include a plurality of tracks concentrically formed with respect to the rotation center of the disc, and if a straight line to connect the rotation center of the HSA and the magnetic head is an HSA line, a crossing angle between a tangential line of a respective track and the HSA line at a point where the magnetic head and the respective track of the disk overlap may be 0 degrees when the head slider is located at a point in the middle circumferences of the disk between the inner circumferences and the outer circumferences, and the crossing angle may increase as the head slider moves towards the inner circumferences or the outer circumferences.

The foregoing and/or other aspects and utilities of the general inventive concept may also be achieved by providing a disk drive apparatus including one or more disks, a head slider unit including a surface facing a respective disk, the surface including an air bearing surface (ABS) pattern having an ABS line disposed in a center of the ABS pattern, an air flow line to indicate a direction of air flow generated by rotation of the respective disk, and a crossing angle formed by the airflow line and the ABS line, wherein the crossing angle increases based on an distance between a position of the head slider unit in a radial direction of the respective disk and a rotational center of the respective disk.

The crossing angle may be substantially 0 degrees when the position of the head slider unit is proximate to the rotational center of the respective disk.

The crossing angle increases as the distance between the position of the head slider unit and the rotational center increases.

The foregoing and/or other aspects and utilities of the general inventive concept may also be achieved by providing a disk drive apparatus including one or more disks having an inner circumference range, a middle circumference range and an outer circumference range, the apparatus including a head slider unit including a surface facing a respective disk, the surface including an air bearing surface (ABS) pattern having an ABS line disposed in a center of the ABS pattern, an air flow line to indicate a direction of air flow generated by rotation of the respective disk, and a crossing angle formed by the airflow line and the ABS line, wherein the crossing angle is substantially 0 degrees when the head slider unit is in the inner circumference range, the crossing angle is greater when the head slider unit is in the middle circumference range than when the head slider unit is in the inner circumference range, and the crossing angle is greater when the head slider unit is in the outer circumference range than when the head slider unit is in the middle circumference range.

The foregoing and/or other aspects and utilities of the general inventive concept may also be achieved by providing a head slider usable with a disk drive, the head slider including a surface formed in a shape of a parallelogram, and facing a respective disk of the disk drive apparatus, and an air bearing surface (ABS) pattern formed on the surface, wherein the ABS pattern is inclined at a same angle as the parallelogram is inclined with respect to a rectangle.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE PREFERRED EMBODIMENTS

Figure 1:
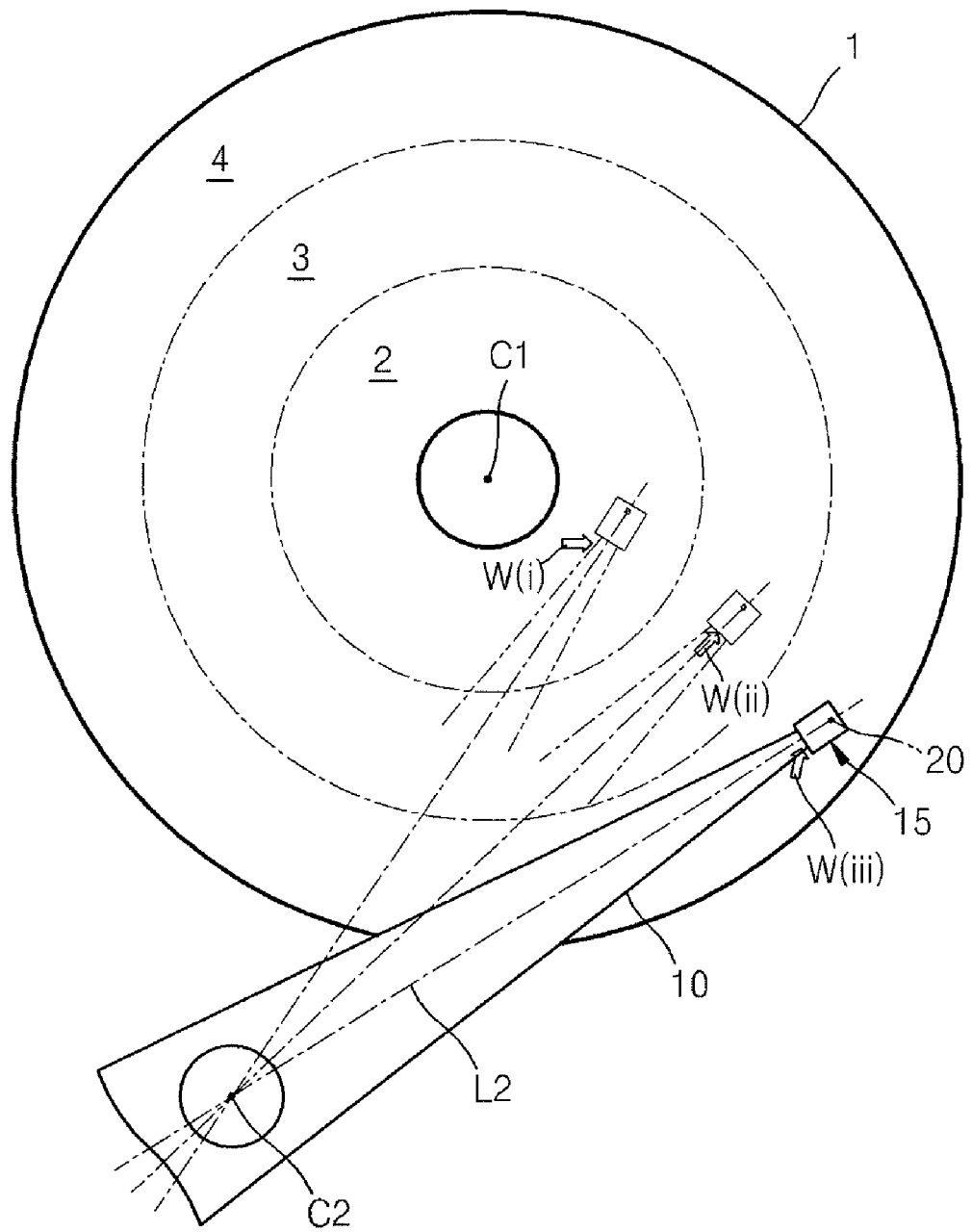
FIG. 1 is a plan view illustrating a conventional head slider floating over a disk in a conventional hard disk drive (HDD)

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
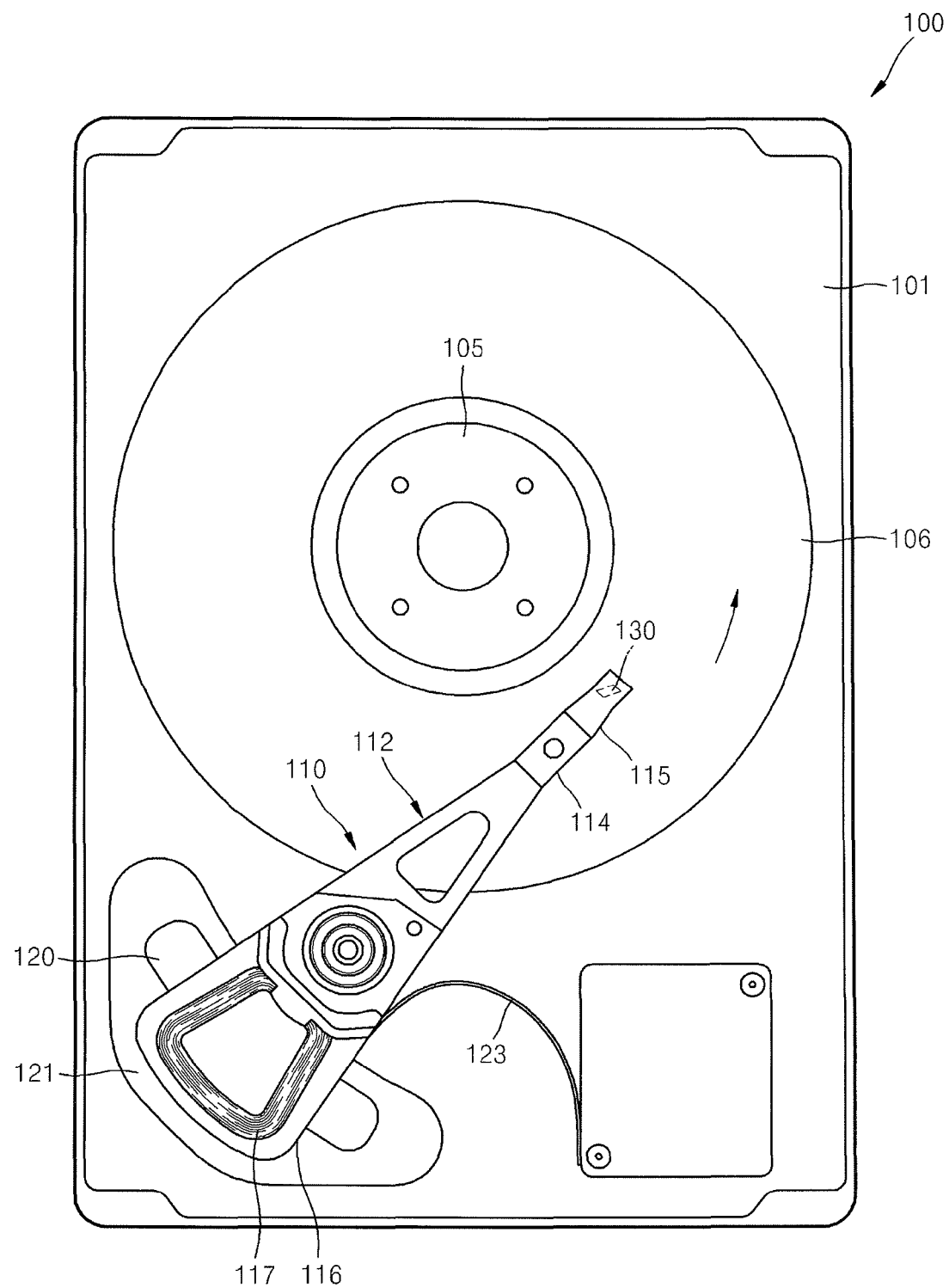
FIG. 3 is a plan view illustrating an HDD according to an embodiment of the present general inventive concept.

FIG. 3 is a plan view illustrating an HDD 100 according to an embodiment of the present general inventive concept.

Referring to FIG. 3, the HDD 100 includes a spindle motor 105, a disk 106, which is a storage medium, and a head stack assembly (HSA) 110 in a housing including a base member 101 and a cover member (not illustrated) combined with the base member 101. The spindle motor 105 rotates the disk 106 at a high speed, and is fixed on the base member 101, and the disk 106 is coupled with the spindle motor 105 so as to rotate at a high speed in a counter clockwise direction. Due to the high speed rotation of the disk 106, an air flow that flows in a same rotation direction of the disk 106 is induced on a surface of the disk 106.

The HSA 110 includes a head slider 130 on which a magnetic head (not illustrated) that performs write or read data operations on the disk 106. The head slider 130 writes data on the disk 106 or reads data recorded on the disk 106 by moving to a particular track on the disk 106. The HSA 110 includes a swing arm 112 rotatably coupled with the base member 101, a suspension 115 attached to a fore-end of the swing arm 112 by using a coupling plate 114, and the head slider 130 mounted on a fore-end of a suspension 115. The HSA 110 also includes an overmold 116 that is combined with the swing arm 112 and includes a voice coil 117.

A magnet 120 and a yoke 121 that supports the magnet 120 are disposed on upper and lower sides of the overmold 116. The magnet 120, the yoke 121, and the voice coil 117 of the HSA 110 constitute a voice coil motor to provide a driving force to rotate the HSA 110.

An air flow induced due to the high speed rotation of the disk 106 passes through a gap between the surface of the disk 106 and the head slider 130, generating a lift force which can lift the head slider 130. Thus, the head slider 130 maintains a floating state at a height where the lifting force and the elastic force applied to the suspension 115 towards the disk 106 are at an equilibrium, and in this floating state, a magnetic head 133 formed on the head slider 130 writes data on the disk 106 or reproduces data recorded on the disk 106.

The HDD 100 includes a main circuit board (not illustrated) to control; the driving of the spindle motor 105 and the HSA 110, and the writing and reading of data by the magnetic head 133. The main circuit board is disposed under the base member 101, and is electrically connected to the HSA 110 via a flexible printed circuit 123.

Figure 4:
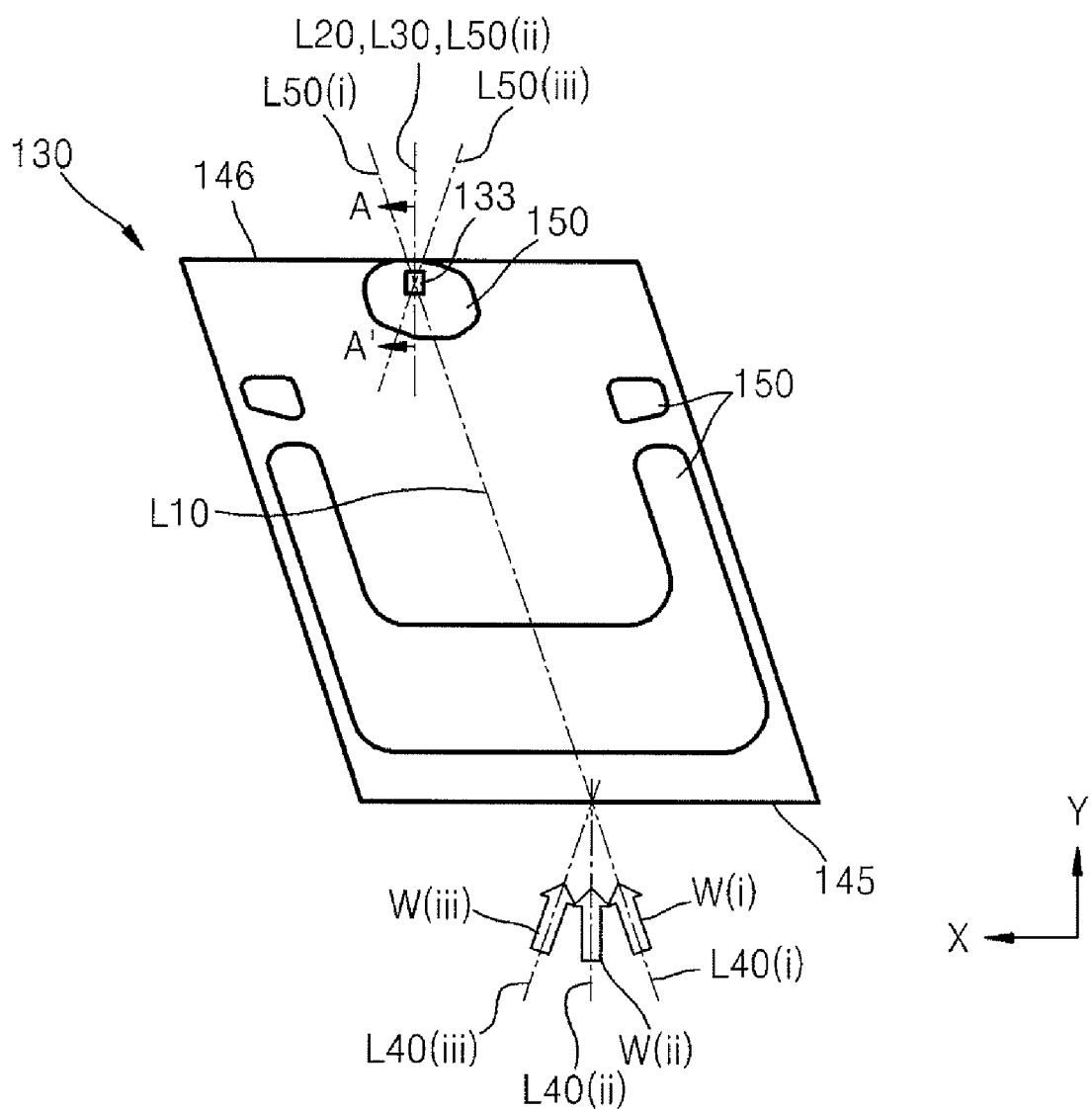
FIG. 4 is a plan view illustrating a head slider that faces a disc, according to an embodiment of the present general inventive concept.
Figure 5:
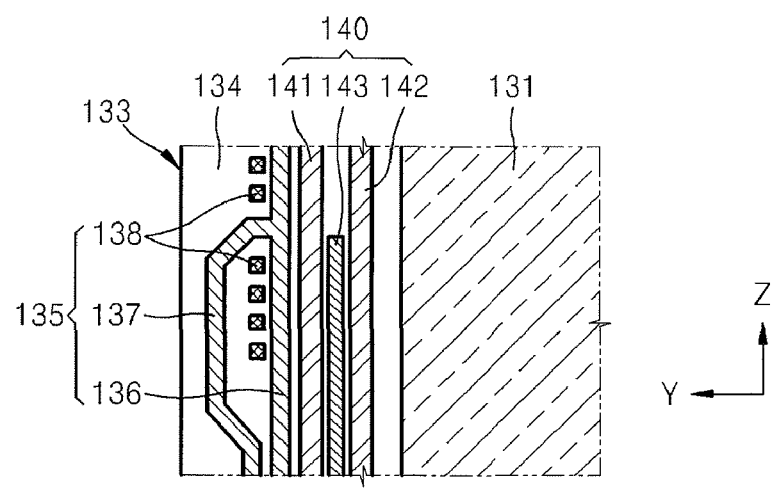
FIG. 5 is a cross-sectional view taken along line A-A' of FIG. 4.
Figure 6:
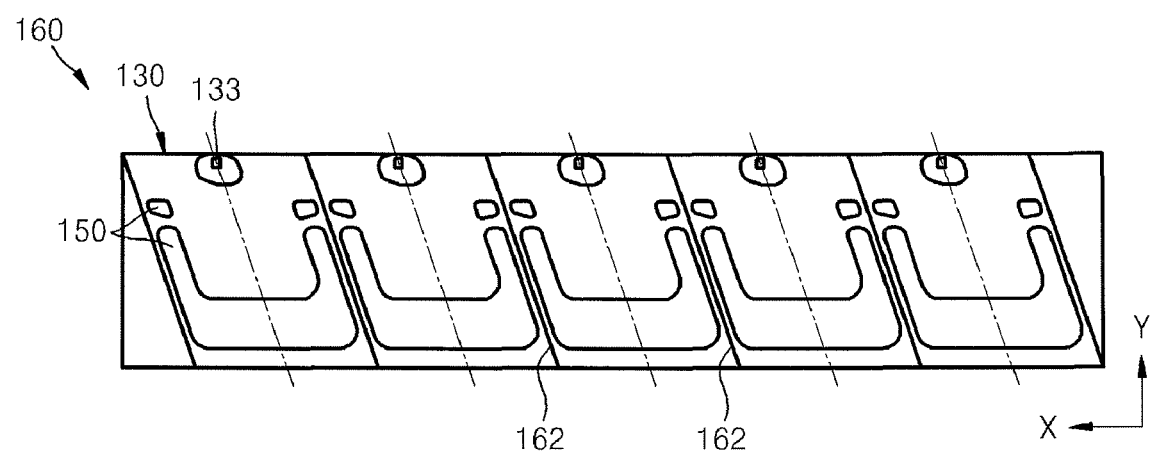
FIG. 6 is a bottom view illustrating a raw bar used to manufacture the head slider according to an embodiment of the present general inventive concept.
Figure 7:
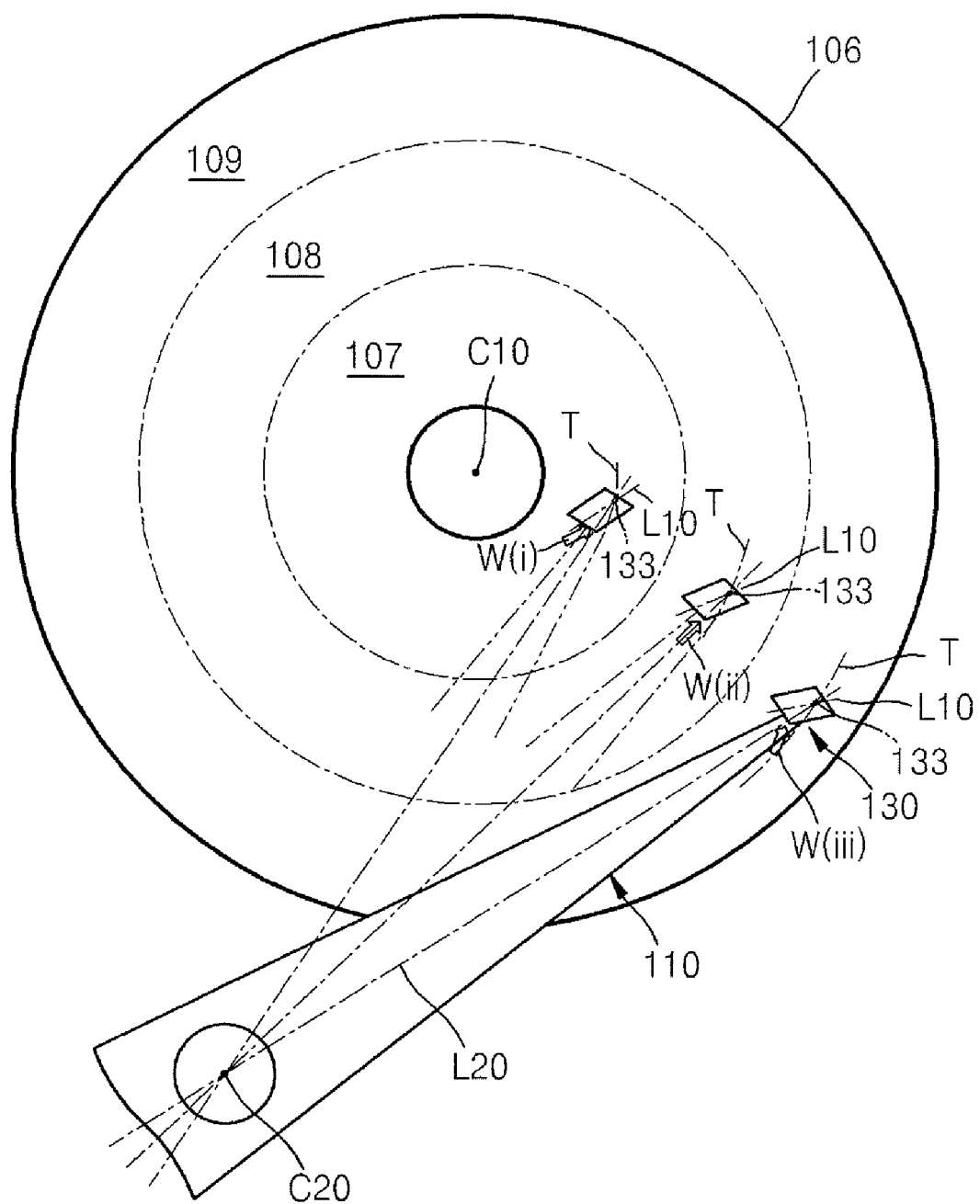
FIG. 7 is a plan view illustrating the head slider floating over the disk in the HDD according to an embodiment of the present general inventive concept.

FIG. 4 is a plan view illustrating the head slider 130 that faces the disk 106, according to an embodiment of the present general inventive concept, and FIG. 5 is a cross-sectional view taken along line A-A' of FIG.4. FIG. 6 is a bottom view of a raw bar 160 used to manufacture the head slider 130 according to an embodiment of the present general inventive concept. FIG. 7 is a plan view illustrating the head slider 130 floating over the HDD 100 according to an embodiment of the present general inventive concept.

Referring to FIGS. 4 and 5, the head slider 130 according to an embodiment of the present general inventive concept includes a slider main body 131 formed of AlTiC and the magnetic head 133 formed on a side of the slider main body 131. The magnetic head 133 is formed on an edge on the fore-end of the head slider 130, that is, on a trailing edge where the air flow caused by the rotation of the disk 106 (refer to FIG. 3) flows out of a surface of the head slider 130 that faces the disk 106. The magnetic head 133 also includes a writing unit 135 to generate a magnetic field to write information on the disk 106 and a reproducing unit 140 to reproduce information recorded on the disk 106, and the writing unit 135 and the reproducing unit 140 are protected by being surrounded with a protective layer 134 formed of alumina $Al_2O_3$.

The writing unit 135 includes a main pole 136 to apply a magnetic field to the disk 106, a return yoke 137 to form a magnetic route together with the main pole 136, and a coil 138 to induce a magnetic field on the main pole 136. The disk 106 is magnetized by leakage flux that leaks below the main pole 136, and thus, data can be written on the disk 106.

The reproducing unit 140 includes a first shield 141 and a second shield 142 parallel to each other and a reproducing sensor 143 such as a giant-magneto resistance sensor provided between the first and second shields 141 and 142. The first and second shields 141 and 142 may be formed of a magnetic material such as FeNi, and the head slider 130 is formed by stacking materials in a Y direction. That is, the slider main body 131 that is formed of AlTiC is firstly stacked, and the reproducing unit 140 and the writing unit 135 are sequentially stacked in the Y direction. Hereinafter, a straight line in the Y direction indicating a direction in which the reproducing unit 140 and the writing unit 135 of the magnetic head 133 are stacked is referred to as a head line L30.

An air bearing surface (ABS) pattern 150 to induce lifting of the head slider 130 is formed on the surface of the head slider 130 that faces the disk 106. However, the surface of the head slider 130 that faces the disk 106 is in a shape of a parallelogram, and thus, the ABS pattern 150 is also inclined in a same angle as that for which the parallelogram is inclined with respect to a rectangle. Accordingly, a center line L10 (hereinafter, an ABS line 10) that denotes the surface of the head slider 130 that faces the disk 106 into a half is not in parallel with respect to the head line L30. The ABS line L10 coincides with a straight line to connect a center of a leading edge 145, which is an edge where the air flow caused by the rotation of the disk 106 (refer to FIG. 3) flows into the surface of the head slider 130 that faces the disk 106, and a center of the trailing edge 146.

Referring to FIG. 6, the head slider 130 can be produced by cutting the raw bar 160 along slice lines 162. The raw bar 160 is formed by sequentially stacking materials in the Y direction, and the ABS pattern 150 can be formed by lapping the raw bar 160 after etching a side of the raw bar 160. In order to form the surface of the head slider 130 that faces the disk 106 having a parallelogram shape, the slice lines 162 are inclined with respect to the Y direction.

Referring to FIGS. 4 and 7, the head slider 130 is mounted on a fore-end of the HSA 110 such that a straight line L20 (hereinafter, HSA line L20) to connect a rotation center C20 of the HSA 110 and the magnetic head 133 can be parallel to the head line L30. Thus, the ABS line L10 is not parallel to the HSA line L20, however, and is inclined. An angle of inclination of the ABS line L10 is identical to that of the ABS line L10 with respect to the head line L30.

Figure 2:
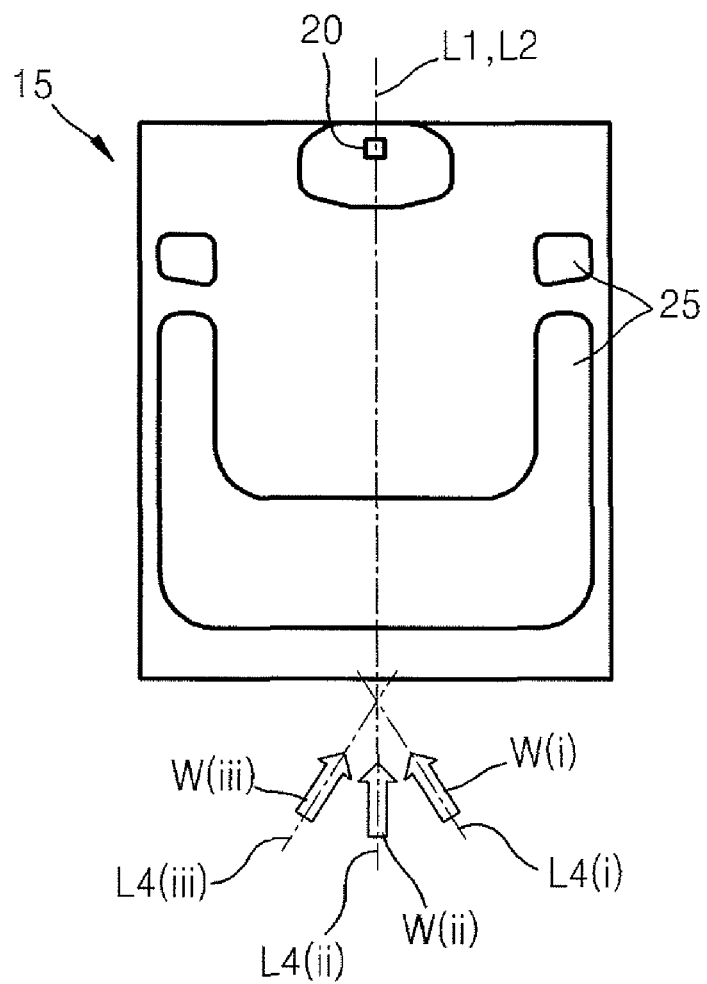
FIG. 2 is a plan view illustrating the conventional head slider that faces the disc.

During the operation of the HDD 100 (refer to FIG. 3), the disk 106 rotates at a high speed in a counter clockwise direction about a rotation center Cl 0, and as a result, an air flow in the counter clockwise direction is induced on the disk 106, and such air flow enters the surface of the head slider 130 that faces the disk 106 and flows along the ABS pattern 150, and thus, generating a lifting force on the head slider 130. A magnitude of the lifting force is related to a speed of the air flow and a shape of the ABS pattern 150, and the speed of the air flow is proportional to a distance from the rotation center C10 of the disk 106. The ABS pattern 150 is inclined at an angle corresponding to the inclination of the ABS line L10 as compared to the conventional ABS pattern 25 (refer to FIG. 2). Therefore, if the speed of the air flow is identical, the lifting force is maximum when the inclined ABS line L10 and the straight line extending in the direction of the air flow (hereinafter, an air flow line) are parallel to each other.

When the head slider 130 is located at a point of inner circumferences 107 of the disk 106, an air flow line L40(i) extending in the direction of the air flow as indicated by the arrow W(i) is parallel or nearly parallel to the ABS line L10, and thus, a crossing angle between the air flow line L40(i) and the ABS line L10 is 0 or approximately 0 degrees. Therefore, the head slider 130 can maintain a stable floating state due to generation of sufficient lifting force despite a low speed of the air flow.

When the head slider 130 is located at a point of middle circumferences 108 outside of the inner circumferences 107 of the disk 106, an air flow line L40(ii) extending in the direction of the air flow indicated by the arrow W(ii) is inclined with respect to the ABS line L10. Thus, a crossing angle between the air flow line L40(ii) and the ABS line L10 greater than that of when the head slider 130 is located at the inner circumferences 107 is formed. However, since the speed of the air flow in the middle circumferences 108 is greater than that of the inner circumferences 107, a sufficient lifting force is generated despite a larger crossing angle, thereby maintaining a stable floating state.

When the head slider 130 is located at a point of the outer circumferences 109 outside of the middle circumferences 108 of the disk 106, an air flow line L40(iii) extending in the direction of an air flow as indicated by the arrow W(iii) is further inclined with respect to the ABS line L10 as compared to the case when the head slider 130 is located at a point of the middle circumferences 108 of the disk 106. Thus, a crossing angle between the air flow line L40(iii) and the ABS line L10 is even greater than that of when the head slider 130 is located at the middle circumferences 108 is formed. However, since the speed of the air flow on the outer circumferences 109 is even greater than that of in the middle circumferences 108, a sufficient lifting force is generated despite the larger crossing angle, thereby maintaining a stable floating state.

The disk 106 includes a plurality of tracks T that are concentric with respect to the rotation center C10, and data are recorded on the tracks T. When the head slider 130 is located at a point on the middle circumferences 108 of the disk 106, a crossing angle between a tangential line L50(ii) of the track T and the head line L30 is 0 degrees at the point where the magnetic head 133 and a track T formed on the middle circumferences 108 overlap. Since the head line L30 and the HSA line L20 are parallel to each other, the crossing angle between the tangential line L50(ii) of the track T and the HSA line L20 is also 0 degrees. In this way, when the crossing angle between the head line L30 and the tangential line L50(ii) of the track T is 0 degrees, an adjacent track erase (ATE), that is, erasing data on an adjacent track due to write leakage flux is minimized.

When the head slider 130 is located at a point on the inner circumferences 107 of the disk 106, the crossing angle between the tangential line L50(i) of the track T and the head line L30 at the point where the magnetic head 133 and a track T formed on the inner circumferences 107 overlap is greater than that of when the head slider 130 is located at a point of the middle circumferences 108. Since the head line L30 and the HSA line L20 are parallel to each other, the crossing angle between the tangential line L50(i) of the track T and the HSA line L20 also increases. The ATE is increased when the head slider 130 is located at a point on the inner circumferences 107 than when the head slider 130 is located at a point on the middle circumferences 108.

When the head slider 130 is located at a point on the outer circumferences 109 of the disk 106, a crossing angle between the tangential line L50(iii) of the track T and the head line L30 at a point where the magnetic head 133 and a track T formed on the outer circumferences 109 overlap is greater than that of when the head slider 130 is located at a point on the middle circumferences 108. Since the head line L30 and the HSA line L 20 are parallel to each other, the crossing angle between the tangential line L50(iii) of the track T and the HSA line L20 is also increased. The direction of the inclination of the tangential line L50(i) of the track T with respect to the head line L30 that is located at the inner circumferences 107 and the direction of inclination of the tangential line L50(iii) of the track T with respect to the head line L30 that is located at the outer circumferences 109 are opposite to each other. The ATE is increased when the head slider 130 is located at a point on the outer circumferences 109 than when the head slider 130 is located at a point on the middle circumferences 108.

However, in the head slider 130 according to an embodiment of the present general inventive concept, since the ABS line L10 is inclined with respect to the head line L30, a crossing angle between the tangential line L50(iii) of the track T and the head line L30 is not increased as much as the crossing angle between the ABS line L10 and the airflow line L40(iii). Accordingly, the ATE does not rapidly increase when the head slider 130 is located at the outer circumferences 109, and thus, a level of the ATE equivalent to that of a conventional head slider 15 can be maintained over an entire span of the inner circumferences 107, the middle circumferences 108, and the outer circumferences 109 of the disk 106.

According to various embodiments of the present general inventive concept, a sufficient lifting force is generated even when the head slider 130 is located at the inner circumferences 107, thereby maintaining a stable floating. Therefore, the damage to the disk 106 and the head slider 130 due to head-disk interference (HDI) can be prevented.

Also, according to various embodiments of the present general inventive concept, while maintaining a stable floating state, an ATE characteristic equivalent to the conventional level can be maintained, thereby preventing degradation of writing/reproducing characteristics of data.

While the present general inventive concept has been particularly illustrated and described with reference to exemplary embodiments thereof, it will be understood by those of ordinary skill in the art that various changes in form and details may be made therein without departing from the spirit and scope of the present general inventive concept as defined by the following claims.

What is claimed is:

1. A hard disk drive, comprising:
   a base member;
   a disk which is a data storage medium to rotate at a high speed on the base member; and
   a head stack assembly (HSA) having a head slider including a magnetic head to write data on the disk or to reproduce data recorded on the disk,
   the magnetic head comprising:
      a reproducing unit to reproduce data; and
      a writing unit stacked on a side of the reproducing unit to write data, and when a straight line extending in a direction in which the reproducing unit and the writing unit are stacked is a head line, an ABS line is inclined with respect to the head line; and
   an ABS pattern formed on a disk facing surface of the head slider to generate a lifting force, and is rotatably mounted on the base member so that the head slider moves between inner circumferences and outer circumferences of the disk in a floating state over the disk,
   wherein when a center line of the ABS pattern is the ABS line and a straight line extending in a direction in which an air flow induced due to the high speed rotation of the disk enters the ABS pattern is an air flow line, a first crossing angle between the ABS line and the air flow line is reduced as the head slider moves from the outer circumferences to the inner circumferences, and
   wherein, when a straight line to connect a rotation center of the HSA and the magnetic head is an HSA line, the HSA line and the head line are parallel to each other and the ABS line is inclined with respect to the HSA line.

2. The hard disk drive of claim 1, wherein the disk comprises:
a plurality of tracks concentrically formed with respect to a rotation center of the disk, and a second crossing angle between a tangential line of a respective track and the head line at a point where the head line and the respective track of the disk overlap is 0 degrees when the head slider is located at a point in middle circumferences of the disk between the inner circumferences and the outer circumferences, and the second crossing angle increases as the head slider moves towards the inner circumferences or the outer circumferences.

3. The hard disk drive of claim 1, wherein the disk comprises:
a plurality of tracks concentrically formed with respect to a rotation center of the disk, and when a straight line to connect a rotation center of the HSA and the magnetic head is an HSA line, a second crossing angle between a tangential line of a respective track and the HSA line at a point where the magnetic head and the respective track of the disk overlap is 0 degrees when the head slider is located at a point in the middle circumferences of the disk between the inner circumferences and the outer circumferences, and the second crossing angle increases as the head slider moves towards the inner circumferences or the outer circumferences.

4. The hard disk drive of claim 1, wherein, when an edge of the head slider where an air flow induced due to the rotation of the disk at a high speed enters the disk facing surface of the head slider is a leading edge, and an edge of the head slider where the air flow that enters from the leading edge flows out is a trailing edge, the ABS line coincides with a straight line to connect a center of the leading edge and a center of the trailing edge.

5. A disk drive apparatus, comprising:
one or more disks;
a head stack assembly (HSA) comprising a head slider unit including a surface facing a respective disk, the surface including an air bearing surface (ABS) pattern having an ABS line disposed in a center of the ABS pattern, and including a magnetic head to write data on the disk or to reproduce data recorded on the disk,
the magnetic head comprising:
a reproducing unit to reproduce data; and
a writing unit stacked on a side of the reproducing unit to write data, and when a straight line extending in a direction in which the reproducing unit and the writing unit are stacked is a head line, an ABS line is inclined with respect to the head line;
an air flow line to indicate a direction of air flow generated by rotation of the respective disk; and
a crossing angle formed by the air flow line and the ABS line,
wherein the crossing angle increases based on a distance between a position of the head slider unit in a radial direction of the respective disk and a rotational center of the respective disk, and
wherein, when a straight line to connect a rotation center of the HSA and the magnetic head is an HSA line, the HSA line and the head line are parallel to each other and the ABS line is inclined with respect to the HSA line.

6. The apparatus according to claim 5, wherein the crossing angle is substantially 0 degrees when the position of the head slider unit is proximate to the rotational center of the respective disk.

7. The apparatus according to claim 6, wherein the crossing angle increases as the distance between the position of the head slider unit and the rotational center increases.

8. A disk drive apparatus including one or more disks having an inner circumference range, a middle circumference range and an outer circumference range, the apparatus comprising:
a head stack assembly (HSA) comprising a head slider unit including a surface facing a respective disk, the surface including an air bearing surface (ABS) pattern having an ABS line disposed in a center of the ABS pattern, and including a magnetic head to write data on the disk or to reproduce data recorded on the disk,
the magnetic head comprising:
a reproducing unit to reproduce data; and
a writing unit stacked on a side of the reproducing unit to write data, and when a straight line extending in a direction in which the reproducing unit and the writing unit are stacked is a head line, an ABS line is inclined with respect to the head line;
an air flow line to indicate a direction of air flow generated by rotation of the respective disk; and
a crossing angle formed by the air flow line and the ABS line,
wherein the crossing angle is substantially 0 degrees when the head slider unit is in the inner circumference range, the crossing angle is greater when the head slider unit is in the middle circumference range than when the head slider unit is in the inner circumference range, and the crossing angle is greater when the head slider unit is in the outer circumference range than when the head slider unit is in the middle circumference range, and
wherein, when a straight line to connect a rotation center of the HSA and the magnetic head is an HSA line, the HSA line and the head line are parallel to each other and the ABS line is inclined with respect to the HSA line.

* * * * *